April 6, 1943.  A. M. STARR  2,315,907
INTERNAL COMBUSTION ENGINE
Filed Dec. 6, 1940  2 Sheets-Sheet 1
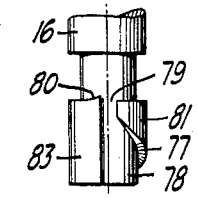
FIG_8_
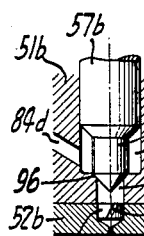
FIG_9_
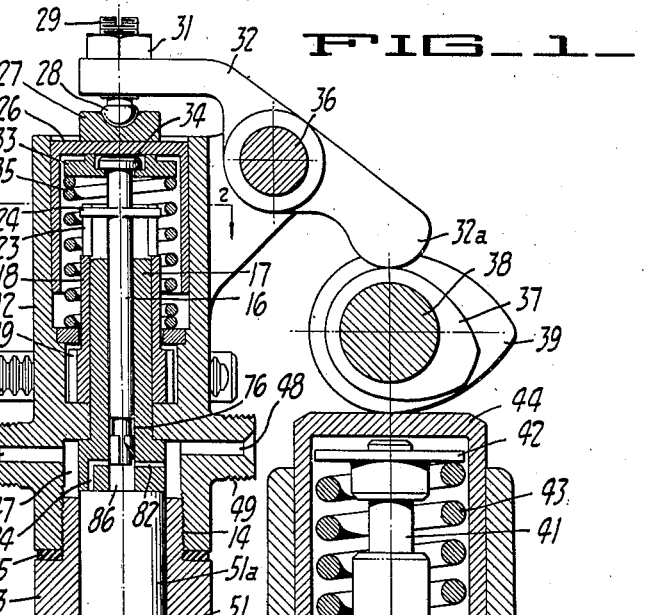
FIG_1_
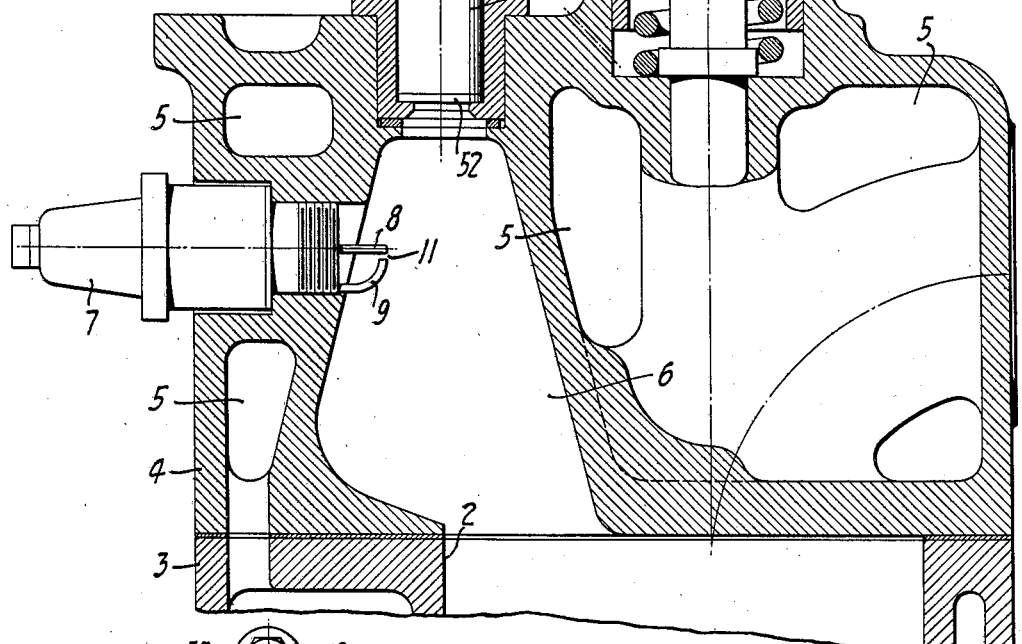
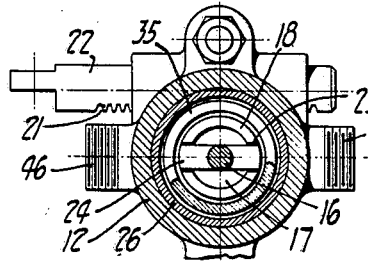
FIG_2_
INVENTOR
Allan M. Starr
BY
ATTORNEY April 6, 1943.  A. M. STARR  2,315,907
INTERNAL COMBUSTION ENGINE
Filed Dec. 6, 1940  2 Sheets-Sheet 2
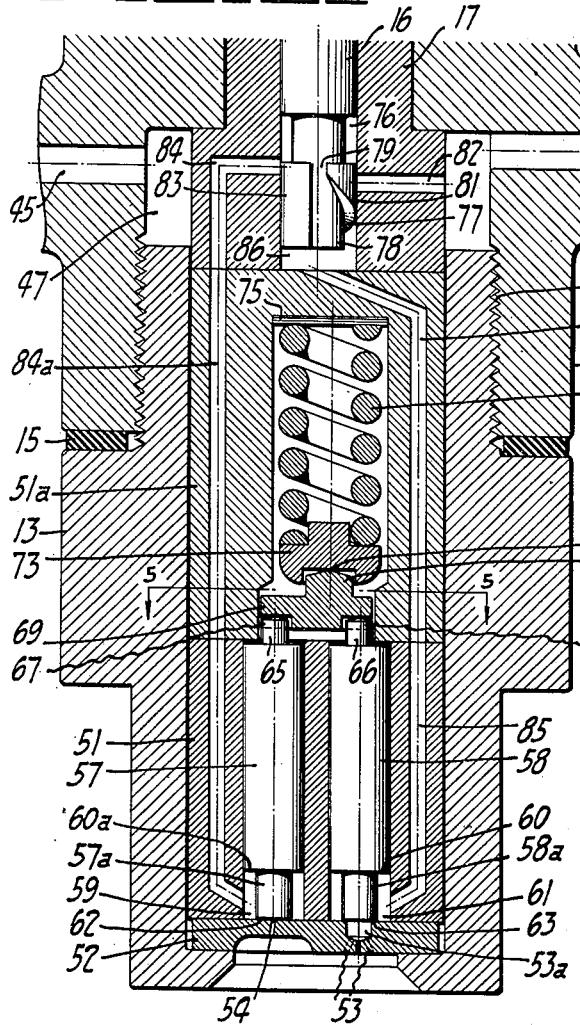
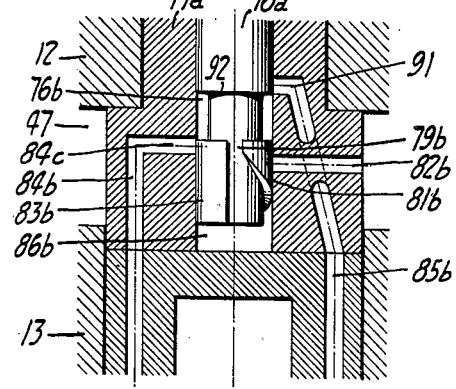
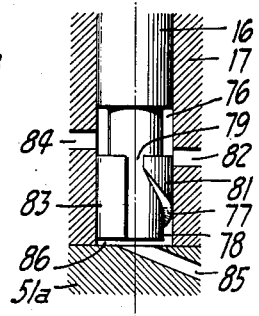
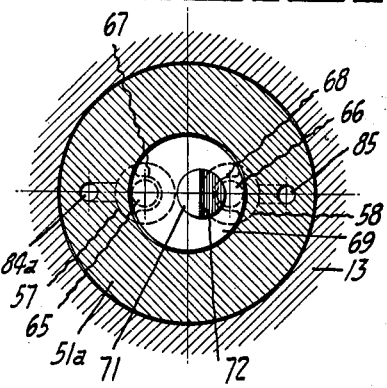
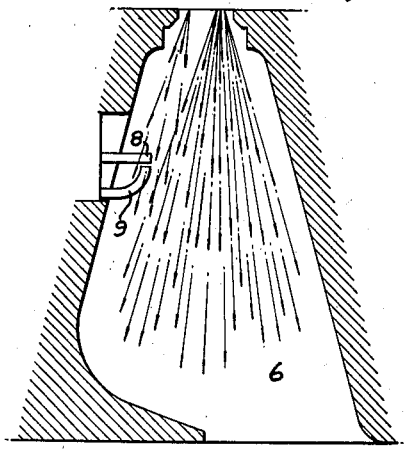
INVENTOR
Allan M. Starr
BY
Ernest G. Sweetland
ATTORNEY Patented Apr. 6, 1943

2,315,907

UNITED STATES PATENT OFFICE 2,315,907

INTERNAL COMBUSTION ENGINE

Allan M. Starr, Piedmont, Calif., assignor to Starr & Sweetland, San Francisco, Calif., a copartnership composed of Ernest J. Sweetland and Allan M. Starr Application December 6, 1940, Serial No. 368,828

14 Claims. (Cl. 123—32)

This invention relates to internal combustion engines of the solid fuel injection, spark ignition type, and especially those designed for the use of non-volatile fuel such as Diesel oil and the like.

One of the problems in the construction of a spark ignition oil burning engine resides in the fact that the size of the fuel charge, and consequently the nature of the fuel spray entering the combustion chamber, varies greatly under different conditions of speed and load. When a single injector nozzle of ordinary design (and I refer to a single nozzle as one which produces a single fuel spray even though there may be a plurality of apertures in the nozzle contributing to its single spray) is used in a spark ignition engine using heavy fuel, difficulty is encountered because when the spark plug is located to give the best possible ignition under certain conditions of speed and load, it may not work well under other conditions. For instance, the arrangement of nozzle and spark plug that is ideal for idling may be unsatisfactory for operating under heavy loads or at high speeds and vice versa. One of the objects of this invention is to overcome this difficulty by providing two injector nozzles, one of which is designated as the load nozzle and is designed to inject a fuel charge in a spray form that obtains the post power and economy inherent in the engine's combustion system; while the other, which may be referred to as the ignition nozzle is particularly adapted to facilitate ignition under all conditions of load and speed.

Another object is to provide an internal combustion engine with a dual injection system, with valved means of separately timing and directing the fuel charge through two separate nozzles, or two separate sets of orifices.

Another object of my invention is to provide a compact fuel injecting mechanism with but one pump plunger and two nozzle valves assembled together, capable of delivering in a controlled manner two separate fuel charges during each cycle.

Another object is to provide an internal combustion engine with a plurality of injector nozzles, one of which is especially adapted to facilitate ignition of the entire fuel charge, and to provide timing means whereby the nozzle adapted to facilitate ignition is timed to inject its charge during the latter part of the injection period of the load nozzle.

Another object is to provide a fuel injector with a pump plunger which has a fixed length of stroke and means formed upon said plunger to regulate the flow of fuel through two separate ducts, the flow through one of said ducts being directed to a load nozzle, while the flow through the other is directed to an ignition nozzle.

A further object is to provide a fuel nozzle with orifices for producing two or more fuel sprays, and valve means to control said sprays, and means for loading the valves controlling the sprays with a single spring so arranged that a greater spring pressure is applied to one valve than to the other.

Another object is to provide a fuel injector with a two spray nozzle fed by a single pump plunger, and means actuated by the rotation of said plunger to vary the quantity of discharge from one of said nozzles through a wide range while the discharge through the other nozzle is varied to a relatively small degree.

In the following description I shall outline in full that form of my invention which I have selected for illustration in the accompanying drawings, but I do not limit myself to the forms of my invention herein illustrated as it is capable of various modifications which are limited only by the scope of the appended claims.

Referring to the drawings:

Figure 1 is a section through the cylinder head of an engine showing the general arrangement of the combustion chamber, spark plug and injector nozzle.

Figure 2 is a section on the line 2—2 of Fig. 1.

Figure 3 is an enlarged vertical section of a portion of my injector nozzle.

Figure 4 is a vertical section showing the metering and timing valve of my injector at the bottom of its stroke.

Figure 5 is a horizontal section on the line 5—5 of Fig. 3.

Figure 6 shows the metering and timing valve with attendant fuel discharge ducts in a modified form of my invention.

Figure 7 shows a combustion chamber with spark ignition points and diagrammatically illustrates the principle of my invention by showing the ignition spray directed toward the spark points while the load spray is directed into the combustion chamber without direct impingement upon said spark points.

Figure 8 shows a modified form of plunger for separately controlling the flow through two injector nozzles.

Figure 9 shows a form of nozzle that may be used advantageously for the ignition spray.

Referring to Fig. 1 in detail, 2 is the upper portion of the engine cylinder. 3 is the upper portion of the engine block to which is secured the cylinder head 4 which is provided with suitable passageways such as shown at 5 for the circulation of cooling water. 6 is the combustion chamber into which is fitted the spark plug 7 which is provided with ignition points 8 and 9 to form the spark gap 11. Secured to the cylinder head by any suitable means, is the fuel injector mechanism, comprising casing 12 which is secured to the upper portion of the nozzle casing 13 by means of the thread 14. 15 is a gasket to insure a tight joint between the parts 12 and 13. Within the casing 12 is the pump plunger 16 which is lapped to a close sliding fit in the hole through the pump barrel or bushing 17, which is mounted in stationary position in the casing 12. A sleeve 18 is rotatably mounted upon the pump barrel 17. This sleeve is provided with gear teeth 19 which mesh into the teeth 21 of the rack 22. The upper portion of the sleeve 18 is slotted as shown at 23, and ears 24 protruding from pump plunger 16 are slidably fitted in slot 23 whereby pump plunger 16 is caused to rotate when the sleeve 18 is rotated by movement of the rack 22. The output of the engine is controlled by rack 22, and on a multi-cylinder engine a suitable linkage controls the movement of the racks 22 so that each cylinder of the engine delivers its proportionate share of the engine's output. The guide cup 26 is slidably mounted in the casing 12, and on its upper surface carries the bearing cup 27, which is recessed to receive the spherical end 28 of the screw 29 which is adjustably secured to the rocker arm 32 by the lock-nut 31. The upper flanged end 34 of the pump plunger 16 has a free fit in the recess of the washer 33, and the spring 35 maintains a constant upward pressure on the washer 33, guide cup 26 and attendant parts. The rocker arm 32 is rotatably mounted upon the shaft 36 and the lower end 32a of the rocker arm acts as a cam follower against the cam 37. The cam 37 which operates the rocker arm 32, and the cam 39 which operates the intake valve are both fixed to the cam shaft 38. 41 is the intake valve stem which, by means of the washer 42 and the spring 43 is urged upwardly to hold the valve in closed position. 44 is the guide cup and cam follower for valve stem 41. Fuel oil is supplied to the injector mechanism through the conduit 45 which is connected with a source of oil supply under a low pressure, say 3 to 10 lbs. per square inch by means of tubing which is connected by suitable fittings to the thread 46. 47 is an annular recess which, during operation, is maintained full of oil at low pressure to supply the injector. The conduit 48 is a return which connects with a tube leading back to the source of supply. The object of this return flow is to maintain circulation in the annular chamber 47 to minimize the formation of foam or air pockets in this chamber. At some point in the return line which is connected to the conduit 48 by means of thread 49 I may provide a loaded valve or other means of resistance so that a constant pressure of fluid will be maintained in the chamber 47. The details of construction of the lower part of the fuel injector mechanism are omitted from Fig. 1 as they are shown in enlarged detail in Fig. 3.

Figure 2, which is a section on the line 2—2 of Fig. 1 shows the arrangement of the rack 22 for rotating the pump plunger 16 and shows the ears 24 which work up and down in the slot 23 of the rotatable sleeve 18.

Figure 3 shows the lower portion of the fuel injector mechanism with the pump plunger 16 in an intermediate position. The casing 13 carries the valve guide 51 and spring housing 51a which are rigidly mounted within it. The pump barrel 17, the spring housing 51a, the valve guide 51 and the orifice plate 52 are held together and are located by dowels (not shown) so that the conduits in the respective parts are in alignment, the various surfaces of the parts being lapped to form leak-proof joints between them. The plate 52 carries two separate fuel discharge nozzles; namely, the load nozzle 53 which may have as many orifices as desired, and the auxiliary or ignition nozzle 54 which is preferably of smaller discharge capacity than the main fuel nozzle. Valve plungers 57 and 58 are lapped to a close sliding fit in the guide 51. The lower ends of these plungers are turned to a reduced diameter as shown to provide annular fuel chambers 59 and 61, the lower ends of their stems being ground flat as shown at 62 and 63 to form valves to close the orifice 54 and the passage 53a leading to orifices 53. The upper ends of the valve plungers are turned down to form the stems 65 and 66 which bear against the bottoms of recesses 67 and 68 in the yoke 69. As will be noted in Fig. 5 the yoke 69 has an upwardly extending projection 71 which is eccentric to the axis of the disc-shaped yoke. This projection is ground to an edge 72 which extends across the diameter of the projection and acts as a fulcrum against the flat surface of recessed disc 73, which bears against the yoke 69 with pressure due to the spring 74. The pressure of the spring may be adjusted by varying the number of shims 75. It will be noted that since the bearing edge 72 is off-center, the spring 74 bears against the stem 66 with a greater force than it bears against stem 65 and since the plungers 57 and 58 and their stems 57a and 58a are of equal diameter, the auxiliary or ignition valve 62 will open at a lower pressure than the load fuel valve 63.

Near the lower end of the valve plunger 16 is a recess which forms the annular chamber 76. The extreme lower end of the plunger 16 is cut away in helical form as shown at 77 to form the relieved surface 78 which communicates with annular chamber 76 by means of the slot 79. The ground unrelieved helical-edged surface 81 at the lower portion of the pump plunger forms an effective valve over the port 82 which is constantly kept filled with fuel under pressure through its communication with the annular chamber 47, and the unrelieved surface 83 which is a continuation of the surface 81, forms a valve for intermittently opening and closing the port 84 which communicates with the chamber 59 through the conduit 84a. The conduit 85 forms communication between the chambers 61 and 86.

Referring to Fig. 4 which shows the pump plunger 16 at the bottom of the stroke and Fig. 1 which shows the same plunger at the top of the stroke, it will be understood how the ports 82 and 84 are opened and closed by the reciprocating action of the plunger 16 in timed relation with the engine. Since the pump plunger 16 is rotatable about its axis by means of the rack 22, it will be understood how the fuel supply forced into the combustion chamber is varied to suit different loads and speeds of the engine.

The operation is as follows: Since the annular chamber 47 is always kept full of oil under pressure, oil will flow into chambers 86 and 76 whenever the pump plunger 16 lifts sufficiently to uncover the port 82. (At just what point in the stroke of plunger 16 port 82 will be opened and closed depends upon the angular position of plunger 16 as regulated by the rack 22.) Since the surface 78 is bounded by the helical wall 77 it is obvious that the amount of fuel which is forced through port 85 for each charge will be regulated by the angular position of plunger 16; the farther the plunger 16 is revolved toward the right the smaller the amount of fuel forced out through port 85 and through the main fuel supply nozzle 53 as will be understood from the following description. It will also be understood that as the plunger 16 is rotated toward the right or "off" position, the quantity of fuel forced out through load nozzle 53 will gradually be reduced and will finally be reduced to nothing when there is still an appreciable charge being delivered through ignition nozzle 54. As the plunger 16 is further turned toward the "off" position this charge passing through the ignition nozzle 54 will be reduced until the "off" position is reached when no fuel will be forced past either valve.

Assuming that plunger 16 is at the top of its stroke as illustrated in Fig. 1 the chamber 86 is filled with oil through the port 82. As soon as the cam 37 begins to raise the cam follower 32a the rocker arm forces the plunger 16 downwardly. During the first part of this downward stroke the plunger does not force any oil through port 84 or 85 (see Fig. 3) because a comparatively high fluid pressure is required to open valve 58 or valve 57 against the force of spring 74, and the oil pressure in the feed system including chamber 47 is only a few pounds per square inch. Consequently, during the first part of the stroke, while port 82 is still open the oil in chamber 86 merely surges out through the port 82; however, as soon as the helical valve surface 81 in its downward travel closes port 82 (port 84 now also being closed), then the continued downward stroke of plunger 16 creates a high pressure in the chamber 86, duct 85 and chamber 61. This pressure against the shoulder 60 causes valve plunger 58 to rise and the fuel charge is forced out through the apertures 53.

It will be noted from the position of the plunger 16 in Fig 1 that at the top of the stroke the port 84 is almost closed and as the plunger 16 moves down it will be completely closed by surface 83, and remain closed until almost the end of the stroke so that no fuel whatever passes through the port 84 and duct 84a until the plunger 16 reaches the position shown in Fig. 3, at which point the port 84 opens while port 82 is still closed and fuel is forced through duct 84a into the chamber 59.

As has been pointed out the spring force against plunger 57 is less than the spring force against plunger 58 so that the valve 57 is lifted from its seat at a lower pressure than valve 58. Then with plunger 16 in the position shown in Fig. 3 most of the remaining fuel forced from chamber 86 will flow out passage 84a and ignition orifice 54 rather than through passage 85 and load orifice 53 because of the lower opening pressure of valve 57.

It is within the province of my invention to use other means for loading the valve plungers 57 and 58 and I may, under certain conditions, vary the size of the stems 57a and 58a. For instance, 57a may be substantially smaller in diameter than 58a thus increasing the area of the shoulder at the bottom of plunger 57 which is exposed to pressure which would have the effect of making the plunger 57 lift at a lower pressure than 58 even if there were no differential in the spring loading of these plungers.

It will be understood that a higher pressure is required in chambers 59 and 61 to open the valves 57 and 58 respectively than is required to maintain these valves in open position for the reason that while the surfaces 62 and 63 are closed against the orifice plate 52 the only pressure which tends to raise the valves 57 and 58 is that which is exerted against the shoulders 60 and 60a, but after the valves are open then the entire diameter of the valves, including surfaces 62 and 63, are exposed to pressure. It therefore follows that what may be termed the closing pressure or the pressure at which the valves will close is somewhat lower than the pressure required to open them. In carrying out the objects of my invention, I may vary the proportions of the valve surfaces acted upon by fluid pressure in any desired manner.

From the foregoing description, it will be seen that the main fuel supply for engine operation is provided in variable metered quantities through the orifices 53 while a small charge of fuel is fed to the combustion chamber through the aperture 54, and that this latter charge is for the express purpose of facilitating spark ignition. In the normal operation of the engine the main fuel charge, forced through apertures 53 is atomized into the combustion chamber during the compression stroke while the ignition charge, as it may be called, enters the combustion chamber just before the end of the compression stroke, and just before, or simultaneously with the occurrence of the ignition spark. By the means described, I am able to locate the spark points substantially out of line with any fuel jet of the load nozzle, and at the same time I obtain ideal conditions for spark ignition because the nozzle orifice or orifices 54 deliver a spray of fuel that is uniformly correct in volume and force and which is directed at the correct angle toward the spark gap 11, and is substantially the same under all conditions of load and speed. Therefore the wide variations in the volume and force of the spray projected through the load nozzle apertures 53 have no adverse effect upon ignition.

For purposes of illustration I show a plurality of apertures at 53 to provide the main fuel supply, while a single aperture is shown at 54 to provide the ignition fuel spray. These arrangements are subject to wide variation without departing from the spirit of my invention. The important factors are to provide a load fuel supply so directed into the combustion chamber as to produce maximum engine efficiency, and to provide an auxiliary spray of fuel especially designed for easy ignition so arranged as to start the flame through the combustion chamber to the best advantage, while the spark plug is protected from direct impingement of the main fuel supply.

While the engine is running under heavy load the fuel charge through the load nozzle is very much larger than the charge from the ignition nozzle while at idling speeds the fuel charge through the load nozzle may be reduced to nothing, the discharge from the ignition nozzle being sufficient to supply the engine requirements under idling conditions.

It should be noted that the valve arrangement described is such that the starting point of the entrance of the ignition charge into the combustion chamber is timed at a later period in the cycle than the starting point of the entrance of the load charge, although the two charges may terminate substantially simultaneously, and as the load charge is reduced in quantity, its starting time approaches the starting time of the ignition charge.

In some instances I have found it desirable to use a pair of very small converging apertures for the ignition nozzle, the jets from which converge a short distance from the orifice plate to form a fan-shaped spray, a portion of which impinges upon the spark ignition wires while the fan-shaped jet flares out in the combustion chamber to ignite the load charge.

In other instances I have found it desirable to use an orifice for the ignition nozzle with an approach so arranged as to impart a revolving flow through the orifice and thus produce what is commonly termed a centrifugal spray which I have found has desirable characteristics for spark ignition.

The modified form of my invention illustrated in Figure 6 is designed to accomplish the same purposes as those heretofore described, and all of the parts of the apparatus omitted from Figure 6 are substantially the same as those above described. In this modification the pump plunger 16a performs a similar function to pump plunger 16 in Fig. 3, the variations in metering the fuel charge being carried out as before described by rotating the pump plunger 16a. Passage 84b corresponds to passage 84a in Fig. 3 and passage 85b corresponds to passage 85 in Fig. 3. The operation of this modification is as follows: As the plunger 16a moves down from its uppermost position, fuel is forced out of passage 82b until the helically-bounded surface 81b closes passage 82b. As the plunger 16a continues downwardly with passage 82b closed, fuel is forced out of port 91 and down passage 85b and out of the load nozzle, it being understood that for this part of the pump travel port 91 is open into the annular space 76b. As the pump plunger 16a continues downwardly and fuel continues to be forced down passage 85b, the port 84c is finally opened, as seen in Fig. 6 with the plunger position shown. As the plunger 16a continues downwardly fuel is forced out of port 84c and down passage 84b and out of the ignition nozzle. Since port 91 is now closed by shoulder 92 the flow in passage 85b is positively cut off at the time the flow in passage 84b commences. As the plunger 16a continues downwardly, fuel continues to flow down passage 84b until surface 81b uncovers port 82b which allows fuel to flow out port 82b which reduces the pressure in chamber 86b and terminates the injection of fuel into the engine. With this modified port arrangement the load nozzle and the ignition nozzle may have the same opening pressure, the division of the fuel charge being positively controlled by the relative positions of ports 84c, 82b and 91. This modification provides a cut-off for the load nozzle causing the remainder of the fuel charge to be positively forced through the ignition nozzle.

In illustrating my invention I have shown the ports 82 and 84 in Figure 3 and the ports 82b and 84c in Figure 6 at different levels. It is within the province of my invention to change the respective levels of these ports, or to place them directly opposite each other, if desired. In the event that these ports are varied in their levels from the positions illustrated in the accompanying drawings I may vary the upper wall of the valve surface 83 or the upper wall of the valve surface 81 accordingly to obtain the desired results in the operation of the injector. For instance, if the two ports are placed upon the same level then I may obtain results substantially the same as those described by lowering the upper boundary wall of the valve surface 83 in such manner as to produce the correct amount of fuel discharge through the port 84 with respect to the amount of fuel being discharged through the port 85. Obviously, the upper walls of the valve surfaces 81 and 83 may be curved to any desired contour whereby both the timing and the volume of the charges through ports 84 and 85 may be varied by the angular position of the pump plunger 16 to produce the desired quantities of fuel through the load nozzle and ignition nozzle respectively, and to vary the timing of discharge therethrough to produce the best operation of the engine under different conditions of load and speed.

An example of how the contour of the valve closing surface may be varied to carry out certain objects of my invention is shown in the modification illustrated in Figure 8. In this case the upper edge of the surface 83 is curved upwardly as shown at 80 to gradually reduce the opening of the port 84 as the plunger 16 is rotated toward the "off" position.

Figure 9 illustrates a modified form of valve and injector nozzle which has proven satisfactory for the ignition nozzle heretofore referred to. The valve member 57b of Figure 9 corresponds to 57 of Figure 3 and the orifice 54b of Figure 9 corresponds to orifice 54 of Figure 3. In this modification the valve stem 57c is ground and lapped to form a seal against the valve seat 96, and the fuel is forced through the duct 84d which corresponds to duct 84a of Fig. 3. The orifice plate 52b is provided with the whirl plug 97 which is mounted in stationary position and has a plurality of helical or angular grooves cut in its periphery as shown at 98. When the valve 57b lifts due to fluid pressure in chamber 59b the fuel is forcibly projected through the angular grooves 98 which imparts a whirling motion to the spray issuing from the orifice 54b which is so directed in the combustion chamber as to be ignited by a spark to the best advantage. The whirling spray produced by a properly proportioned nozzle of this type is discharged in an extremely fine state of atomization and does not penetrate far into the combustion chamber, whereas the load spray through the orifices 53 penetrates to the remote extremities of the chamber.

Regardless of the specific details of the injector nozzles, one of the important objects of my invention is to provide ignition means in the combustion chamber and to provide a special injector nozzle, which I may refer to as the ignition nozzle, which provides a spray of extremely fine atomization and disperses the fuel in such a manner as to give it a relatively low penetrating force into the combustion chamber, adjacent the spark ignition means. While the charge through this nozzle is subject to some variation under different conditions of load and speed, such variation does not interfere with it readily being ignited by the spark. On the other hand, the discharge from the load nozzle is given high penetrating qualities to carry it to the remote extremities of the combustion chamber under full load, and is subject to wide variations in volume. A spray of such wide variability is not, per se, well adapted to spark ignition, but the ignition that is readily started by the spark in the spray from the ignition nozzle is rapidly spread throughout the entire combustion chamber.

Wherever the terms "spray," or "fuel spray" are used in the specification and claims, I refer to the spray produced by an injector nozzle regardless of the type or shape of the nozzle, and regardless of whether the spray is produced through a single orifice or a plurality of orifices each contributing to the formation of the spray.

I claim:

1. Fuel injector means for internal combustion engines comprising a plurality of injector nozzles each having an orifice; a pump plunger and a pump barrel; a plurality of ports leading from said barrel to said injector nozzles; valve means on said pump plunger to control the flow through said ports; and means to cause said plunger to rotate about its axis; said valve means having surfaces arranged and constructed to vary the discharge through said ports and nozzles by rotation of said plunger while said plunger is operating at a substantially constant length of stroke; said surfaces varying in shape to produce a greater variation in discharge through one of said nozzles than through the other.

2. The construction set forth in claim 1 including loaded valves to close the orifices in said nozzles; said loaded valves being arranged and constructed to open at different pressures.

3. The construction set forth in claim 1 wherein the valve surfaces on said pump plunger are arranged and constructed to cause one of said ports to open later than the other regardless of the angular position of said plunger.

4. A fuel injecting device comprising: a pump plunger and a pump barrel; a plurality of injectors each having an injector nozzle; a plurality of nozzle valves each controlling the flow of fuel to one of said injector nozzles; means to cause said plunger to rotate about its axis while reciprocating; a port leading from inside said pump barrel to a fuel supply source, said pump plunger having a surface which completely covers said port for a portion of said pump plunger's stroke; a primary passageway leading from one of said nozzle valves to said pump barrel; a secondary passageway leading from another of said nozzle valves to said pump barrel; and means permitting communication between said secondary passageway and said pump barrel during a minor portion of the stroke of said pump plunger.

5. A fuel injecting device comprising: a pump plunger and a pump barrel; a plurality of injectors each having an injector nozzle; a plurality of nozzle valves each controlling the flow of fuel to one of said injector nozzles; means urging said nozzle valves closed including a single spring and an offset yoke arranged so that one nozzle valve is held closed by more force of said spring than the other; means to cause said plunger to rotate about its axis while reciprocating; a port leading from inside said pump barrel to a fuel supply source, said pump plunger having a surface which completely covers said port for a portion of said pump plunger's stroke; a primary passageway leading from one of said nozzle valves to said pump barrel; a secondary passageway leading from another of said nozzle valves to said pump barrel; and means on said pump plunger permitting communication between said secondary passageway and said pump barrel during a minor portion of the stroke of said pump plunger.

6. A fuel injecting device comprising: a plurality of injectors each having a nozzle; means for supplying fuel under pressure to said injectors; a plurality of nozzle valves each controlling the flow of fuel to one of said injector nozzles; a spring urging said nozzle valves to closed position; and means applying the force of said spring unequally to said nozzle valves.

7. A fuel injecting device comprising: a pump plunger and a pump barrel; a plurality of injectors each having a nozzle; a plurality of nozzle valves each controlling the flow of fuel to one of said injector nozzles; passageways connecting said barrel with said nozzle valves; a single spring urging said nozzle valves to closed position; and a yoke communicating the force of said spring to said plurality of nozzle valves simultaneously.

8. A fuel injecting device comprising: a pump plunger and a pump barrel; a pair of injectors each having a nozzle; a pair of nozzle valves each controlling the flow of fuel to one of said injector nozzles; a single spring urging said nozzle valves to closed position; and yoke means interposed between said spring and said nozzle valves, said yoke means being arranged and constructed to impress a greater force upon one of said nozzle valves than upon the other.

9. Fuel injector means for internal combustion engines comprising: a plurality of injectors each having a nozzle; a plurality of nozzle valves each controlling the flow of fuel to one of said injector nozzles; a pump plunger and a pump barrel; a plurality of ports leading from said barrel to said nozzle valves; valve means on said pump plunger to control the flow through said ports; and means to cause said plunger to rotate about its axis, said valve means having a helically bounded surface arranged and constructed to vary the discharge through one of said ports and injector nozzles by rotation of said plunger without said helical surface varying the discharge through the other of said ports.

10. A fuel injecting device for the purposes set forth comprising: a reciprocating pump plunger and a pump barrel; a plurality of injectors each having a nozzle; a plurality of nozzle valves each controlling the flow of fuel to one of said nozzles; means to cause said plunger to rotate about its axis while reciprocating; a port leading from inside said pump barrel to a fuel supply source, said pump plunger having a surface which completely covers said port for a portion of said pump plunger's stroke; a primary passageway leading from one of said nozzle valves to said pump barrel; a secondary passageway leading from another of said nozzle valves to said pump barrel; and means on said pump plunger to close said primary passageway during a portion of said plunger's stroke and to open said secondary passageway substantially simultaneously with the closing of said primary passageway.

11. A fuel injecting device for the purposes set forth comprising: a pump barrel; a reciprocating plunger in said pump barrel; a pair of injectors each having a nozzle; a pair of spring-loaded nozzle valves each controlling the flow of fuel to one of said nozzles; means to impart a reciprocating motion to said plunger; means to rotate said plunger about its axis while reciprocating; an inlet port leading from the interior of said pump barrel to a fuel supply source; a passageway leading from said pump barrel to each of said nozzle valves; and valve means carried by said plunger to cover one of said passageways during a substantial part of the plunger stroke while the other of said passageways remains open during substantially all of the working stroke of said plunger, said valve means including a helically curved surface to cover said fuel inlet port during a portion of the stroke of said plunger which portion varies in accordance with the degree to which said plunger is rotated about its axis.

12. A fuel injecting device for the purposes set forth comprising: a pump barrel; a reciprocating plunger in said pump barrel; a pair of injectors each having a nozzle; a pair of spring-loaded nozzle valves each controlling the flow of fuel to one of said nozzles; means to impart a reciprocating motion to said plunger; means to rotate said plunger about its axis while reciprocating; an inlet port leading from a fuel supply source to the interior of said pump barrel; a passageway leading from said pump barrel to each of said nozzle valves; a valve surface carried by said pump plunger arranged to close one of said passageways leading to a nozzle valve during a substantially constant portion of the working stroke of said pump plunger regardless of the angular position of said plunger within the rotative working range of said plunger while allowing said other passageway to remain open during substantially the entire working stroke of said plunger; and a helically curved valve surface carried by said plunger arranged to cut off said inlet port during a portion of the working stroke of said plunger to vary the duration of opening of said inlet port for each stroke of said plunger depending upon the angular position of said plunger.

13. The structure set forth in claim 12 wherein one of said spring-loaded nozzle valves is loaded with a lighter spring tension than the other.

14. A fuel injecting device for injecting a main fuel charge into a combustion chamber and a secondary fuel charge to ignite said main charge which comprises: a pump barrel; a reciprocating plunger in said barrel; a main fuel discharge nozzle and a secondary fuel discharge nozzle; a spring-loaded valve to control the opening of each of said nozzles; a passageway leading from said pump barrel to each of said nozzles; means to impart a reciprocating motion to said plunger; means to rotate said plunger about its axis while reciprocating; an inlet port leading from a fuel supply source to the interior of said pump barrel; a valve surface on said plunger to maintain the passageway leading to said secondary nozzle in closed position during the greater portion of the stroke of said plunger; and a second valve surface on said plunger having a helically curved edge to cut off said inlet port during a portion of the stroke of said plunger which portion is varied by the rotation of said plunger while the duration of opening of said secondary nozzle is substantially unaffected by said rotation.

ALLAN M. STARR.